(12) United States Patent
Jang et al.

(10) Patent No.: US 12,085,830 B2
(45) Date of Patent: Sep. 10, 2024

(54) OPTICAL MODULATION DEVICE AND PHASE MODULATION METHOD USING THE SAME

(71) Applicant: Korea Advanced Institute of Science and Technology, Daejeon (KR)

(72) Inventors: Min Seok Jang, Daejeon (KR); Ju Young Kim, Daejeon (KR); Juho Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 146 days.

(21) Appl. No.: 17/496,419

(22) Filed: Oct. 7, 2021

(65) Prior Publication Data
US 2022/0382117 A1    Dec. 1, 2022

(30) Foreign Application Priority Data

May 31, 2021  (KR) .................. 10-2021-0069837

(51) Int. Cl.
*G02F 1/21*         (2006.01)

(52) U.S. Cl.
CPC .............. *G02F 1/213* (2021.01); *G02F 1/218* (2013.01); *G02F 2203/02* (2013.01);
(Continued)

(58) Field of Classification Search
CPC . G02F 1/00; G02F 1/01; G02F 1/0018; G02F 1/0054; G02F 1/0009; G02F 1/0063; G02F 1/21; G02F 1/213; G02F 1/218; G02F 1/0338; G02F 1/0151; G02F 1/0126; G02F 2203/02; G02F 2203/10; G02F 2203/15; G02F 2203/50; G02F 2202/30; G02B 1/00; G02B 1/002; G02B 1/02; G02B 5/00; G02B 5/008; G02B 5/18; G02B 5/1842; G02B 5/1857; G02B 5/1828;
(Continued)

(56) References Cited

U.S. PATENT DOCUMENTS 11,092,870 B2 *   8/2021   Tu ........................... H01Q 3/44
2020/0341346 A1*  10/2020  Jang ......................... G02F 1/29

FOREIGN PATENT DOCUMENTS

KR          101905444      * 12/2018   ............ G02B 1/00

OTHER PUBLICATIONS

English translation of KR 101905444. (Year: 2018).*

* cited by examiner

*Primary Examiner* — Jie Lei
(74) *Attorney, Agent, or Firm* — BKRIP LLC

(57) ABSTRACT

Disclosed are an optical modulation device and a phase modulation method using the same. The optical modulation device includes a reflection plate, an insulating film over the reflection plate, dielectric patterns aligned on the insulating film in a first direction and extended in parallel in a second direction intersecting the first direction, and first and second graphene patterns provided between the dielectric patterns aligned in the first direction and arranged in an alternating fashion. The first and second graphene patterns are in direct contact with the insulating film and the dielectric patterns are in direct contact with the insulating film at locations between the first and second graphene patterns. A width of each of the first graphene patterns in the first direction is different from a width of each of the second graphene patterns in the first direction.

19 Claims, 21 Drawing Sheets

(52) U.S. Cl.
CPC ...... *G02F 2203/10* (2013.01); *G02F 2203/15* (2013.01); *G02F 2203/50* (2013.01)

(58) Field of Classification Search
CPC ................ G02B 27/00; G02B 27/0037; G02B 2207/109; B82Y 10/00; B82Y 20/00; B82Y 30/00
USPC ....... 359/278–280, 244, 238, 276, 565, 566, 359/573, 576; 977/773, 774, 712, 721, 977/723
See application file for complete search history.

OPTICAL MODULATION DEVICE AND PHASE MODULATION METHOD USING THE SAME

CROSS-REFERENCES TO RELATED APPLICATIONS

This application is based on and claims priority under 35 U.S.C. 119 to Korean Patent Application No. 10-2021-0069837, filed on May 31, 2021 in the Korean intellectual property office, the disclosures of which are herein incorporated by reference in their entireties.

TECHNICAL FIELD

The present disclosure relates to an optical modulation device, and more particularly, to an optical modulation device which enables active $2\pi$ phase modulation while maintaining uniform amplitude and a phase modulation method using the same.

BACKGROUND OF THE INVENTION

An optical device for changing the transmission/reflection, polarization, a phase, intensity, a path, etc, of incident light is used in various optical devices. Furthermore, in order to control the properties by using a desired method within an optical system, optical modulators having various structures are suggested.

A conventional wavefront modulator uses liquid crystals or uses a small mirror having a size of a micro unit. The modulator using liquid crystals operates by applying an electrical or thermal signal thereto. The modulator using liquid crystals adjusts a reaction to incident light by using a property in which the direction in which liquid crystals are aligned is determined in response to a signal. The modulator (e.g., digital mirror devices (DMDs)) using small mirrors use the principle that incident light is reflected in a desired direction by adjusting the direction of each of the micro mirrors.

A meta surface means an optical structure which changes a characteristic of incident light and has a thin thickness. The meta surface has advantages in that it shows more improved modulation performance than conventional technologies using liquid crystals or micro mirrors and it can reduce the size of an element to a size smaller than a wavelength several tens of times. Furthermore, the meta surface is actively researched in various fields because reflected light or transmitted light having a desired form can be obtained depending on its characteristic.

Graphene is a substance that constitutes a meta surface and has good characteristics. First, graphene has its characteristic changed by a voltage applied thereto. If a meta surface is constructed using graphene, a degree of modulation can be adjusted by applying an electrical signal. Such a method can obtain a higher modulation speed than the existing method using liquid crystals because it is a method of adjusting Fermi energy of graphene. Second, graphene Plasmon has a size smaller than a photon in the free space several hundreds of times. This is an important characteristic that leads to a reduction in the meta surface.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide an optical modulation device which enables active $2\pi$ phase modulation while maintaining uniform amplitude through an avoided crossing phenomenon and a phase modulation method using the same.

Objects to be achieved by the present disclosure are not limited to the aforementioned object, and the other objects not described above may be evidently understood from the following description by a person having ordinary knowledge in a corresponding technical field.

In an embodiment, an optical modulation device includes a reflection plate, an insulating film over the reflection plate, dielectric patterns aligned on the insulating film in a first direction and extended in parallel in a second direction intersecting the first direction, and first graphene patterns and second graphene patterns provided between the dielectric patterns and alternately aligned in the first direction. The dielectric patterns and the first and second graphene patterns may fully cover the top of the insulating film. Two dielectric patterns adjacent to each other in the first direction with one of the first graphene patterns interposed between the two dielectric patterns may form one dielectric pattern pair. The dielectric pattern pair may be provided in plural. The dielectric pattern pairs may be isolated from each other in the first direction with one of the second graphene patterns interposed between the dielectric pattern pairs. A width of each of the first graphene patterns in the first direction may be different from a width of each of the second graphene patterns in the first direction.

Each of the first and second graphene patterns may come into direct contact with sidewalls of the dielectric patterns on both sides thereof.

The dielectric patterns may come into direct contact with the top of the insulating film.

Each of the first and second graphene patterns may have a single layer structure or a multi-layer structure in which two to ten layers are stacked.

The dielectric pattern pairs may be periodically aligned in the first direction.

The width of each of the first graphene patterns in the first direction and the width of each of the second graphene patterns in the first direction may be predetermined so that graphene Plasmon Fabry-Perot resonates between the dielectric patterns.

The dielectric patterns may include first dielectric patterns and second dielectric patterns facing the first dielectric patterns in the second direction and isolated from each other in the second direction.

The reflection plate may include a metal substance or conductive metal nitride.

The dielectric patterns may include silicon (Si).

A thickness of each of the dielectric patterns and a width of each of the dielectric patterns in the first direction may be identical.

In an embodiment, a phase modulation method may use an optical modulation device, including a reflection plate, an insulating film over the reflection plate, dielectric patterns aligned on the insulating film in a first direction and extended in parallel in a second direction intersecting the first direction, and first graphene patterns and second graphene patterns provided between the dielectric patterns and alternately aligned in the first direction. The method may include making incident light on the optical modulation device, forming a different first resonance and second resonance on the optical modulation device, using an avoided crossing phenomenon of the first resonance and the second resonance, and modulating a phase of the light while simultaneously satisfying a first condition in which a resonant frequency is actively greatly changed, a second condition in which a full width at half maximum (FWHM) of a resonant spectrum is reduced, and a third condition in which amplitude is constantly maintained.

The first resonance may move faster than the second resonance, and the first resonance may be graphene plasmon.

The second resonance may have a narrow spectrum compared to the first resonance, and the second resonance may be quasi-bound states in the continuum (qBIC).

A distribution of electric fields of the first resonance and a distribution of electric fields of the second resonance may be at least partially overlapped.

A change in the phase of light may be $2\pi$ to $4\pi$.

As graphene mobility of the first and second graphene patterns are increased, an absolute value of complex amplitude of the light may be increased.

A width of each of the first graphene patterns in the first direction may be different from a width of each of the second graphene patterns in the first direction.

A width of each of the first graphene patterns in the first direction and a width of each of the second graphene patterns in the first direction may be predetermined so that graphene Plasmon Fabry-Perot resonates between the dielectric patterns.

The dielectric patterns and the first and second graphene patterns may fully cover a top of the insulating film.

Each of the first and second graphene patterns may come into direct contact with sidewalls of the dielectric patterns on both sides thereof, and the dielectric patterns may come into direct contact with a top of the insulating film.

The optical modulation device according to embodiments of the present disclosure can enable active $2\pi$ phase modulation while maintaining uniform amplitude through an avoided crossing phenomenon despite a trade-off problem.

Furthermore, the optical modulation device according to embodiments of the present disclosure and the phase modulation method using the same can be used in various applications, such as spectroscopy using a mid-infrared spectrum, the security industry, academic fields such as chemistry, biochemistry and ecology, in addition to wavefront shaping, holography, and invisibility cloaks because they actively enable $2\pi$ or more phase modulation while maintaining uniform amplitude.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
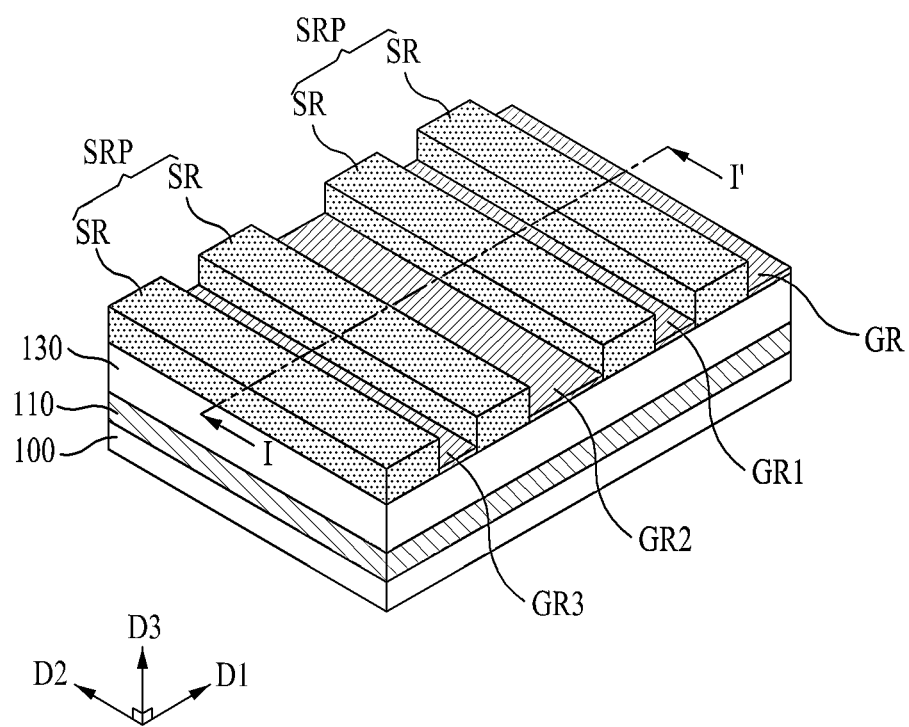
FIG. 1A is a perspective view for describing an optical modulation device according to an embodiment of the present disclosure.

While illustrative embodiments have been illustrated and described, it will be appreciated that various changes can be made therein without departing from the spirit and scope of the invention.

In order to sufficiently understand constructions and effects of the present disclosure, embodiments of the present disclosure are described in detail with reference to the accompanying drawings.

The present disclosure is not limited to embodiments disclosed hereinafter, and may be implemented in various forms and may be modified and changed in various ways. The present embodiments are provided to complete the present disclosure and to allow a person having ordinary knowledge in the art to which the present disclosure pertains to fully understand the category of the present disclosure. In the accompanying drawings, a ratio of each component may be exaggerated or reduced for convenience of description.

Terms used in this specification are intended to describe embodiments and are not intended to limit the present disclosure. Furthermore, the terms used in this specification, unless defined otherwise in the context, may be construed as having meanings commonly known to a person having conventional knowledge in the corresponding field.

In this specification, the singular form, unless specially described otherwise in the context, also includes the plural form. "comprise" and/or "comprising" used in this specification means that a mentioned component, step, operation and/or device does not exclude the existence or addition of one or more other components, steps, operations and/or devices.

In this specification, terms, such as "first" and "second", may be used to describe various areas, directions, shapes, but the areas, directions, shapes should not be restricted by the terms. The terms are used to only distinguish any given area, direction or shape from another area, direction or shape. Accordingly, a part described as a first part in any one embodiment may be described as a second part in another embodiment. Embodiments described and illustrated herein also include complementary embodiments thereof. In the entire specification, parts indicated by the same reference numeral denote the same components.

Hereinafter, an optical modulation device and a phase modulation method using the same according to embodiments of the present disclosure are described in detail with reference to the accompanying drawings.

Figure 1B:
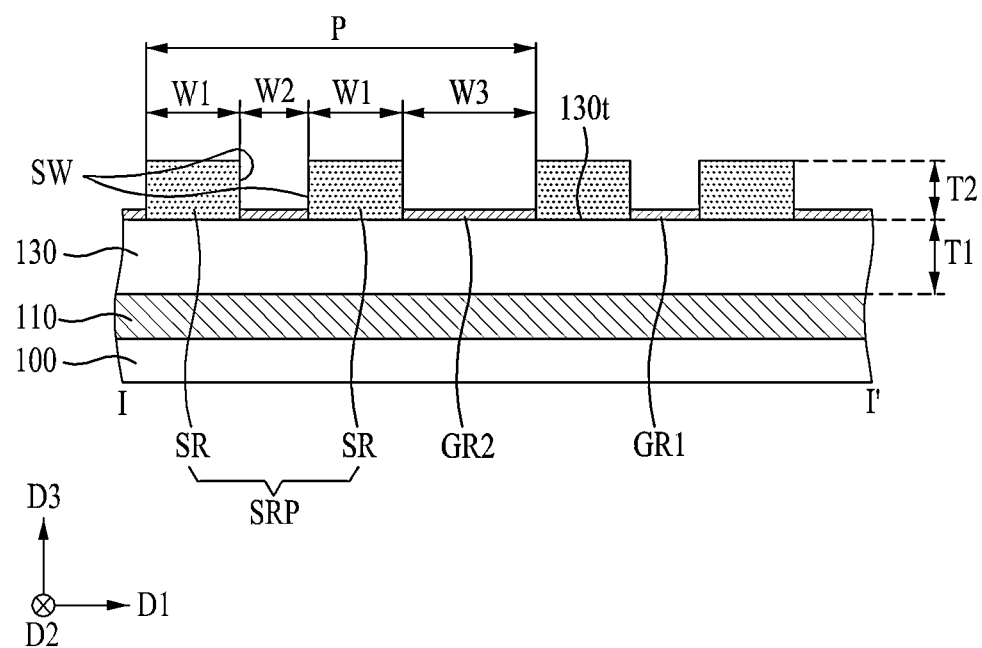
FIG. 1B is a cross-sectional view for describing the optical modulation device according to an embodiment of the present disclosure, and corresponds to a cross section taken along line I-I' in FIG. 1A.

FIG. 1A is a perspective view for describing an optical modulation device according to an embodiment of the present disclosure. FIG. 1B is a cross-sectional view for describing the optical modulation device according to an embodiment of the present disclosure, and corresponds to a cross section taken along line I-I' in FIG. 1A.

Referring to FIGS. 1A and 1B, the optical modulation device according to the present disclosure may include a substrate 100, a reflection plate 110, an insulating film 130, dielectric patterns SR, and first and second graphene patterns GR1 and GR2.

The substrate 100 may be a semiconductor substrate, such as a silicon substrate, for example. The substrate 100 may have a top parallel to a first direction D1 and a second direction D2 intersecting the first direction D1 and orthogonal to a third direction D3. The first to third directions D1, D2, and D3 may be directions orthogonal to each other, for example. In some embodiments, the substrate 100 may not be provided.

The reflection plate 110 may be provided on the substrate 100. The reflection plate 110 may have a flat panel form extending in parallel to the top of the substrate 100. The reflection plate 110 may include a metal substance or conductive metal nitride. The reflection plate 110 may include any one of titanium (Ti), tantalum (Ta), tungsten (W), gold (Au), silver (Ag), copper (Cu), aluminum (Al), titanium nitride (TiN) or tantalum nitride (TaN), for example. Although not illustrated, an additional film (e.g., an insulating film) may be interposed between the substrate 100 and the reflection plate 110. The reflection plate 110 may reflect light incident on the optical modulation device according to the present disclosure, and may enable reflected light to interact with an optical resonance mode formed in a meta surface to be described later.

The insulating film 130 may be provided on the reflection plate 110. The insulating film 130 may include silicon oxide ($SiO_2$), silicon nitride (SiN), silicon oxynitride (SiON) or silver chloride (AgCl), for example, but the present disclosure is not limited thereto. The insulating film 130 may have a first thickness T1 in the third direction D3. The first thickness T1 may be greater than a thickness of the reflection plate 110 in the third direction D3. Hereinafter, the thickness means the thickness in the third direction D3.

The plurality of dielectric patterns SR and the first and second graphene patterns GR1 and GR2 may be provided on the insulating film 130. The plurality of dielectric patterns SR and the first and second graphene patterns GR1 and GR2 may construct a meta surface on the insulating film 130.

When light is incident on the meta surface, charges within each of the dielectric patterns SR are redistributed due to the electric fields of light and the periodical structure of the meta surface. Accordingly, multi-poles (chiefly dipoles) are formed within each of the dielectric patterns SR or between the dielectric patterns SR, and an electric field may be locally amplified. That is, the meta surface may form the optical resonance mode. In the optical resonance mode, redistributed charges may be vibrated in accordance with incident electromagnetic waves (i.e., incident light). The vibrated charges may emit light to the outside again. In this case, a phase of the emission light may be different from a phase of the incident light depending on how the charges are vibrated (i.e., depending on a structure and substance characteristic of the meta surface). Theoretically, a difference between the phases of the incident light and the emission light according to the optical resonance mode may be 0 to $\pi$ when the reflection plate 110 is not present, and may be 0 to $2\pi$ when the reflection plate 110 is present.

From a planar perspective, the dielectric pattern SR may have a line form or a bar form. The dielectric patterns SR may be aligned in the first direction D1, and may be extended in parallel in the second direction D2. The dielectric patterns SR may be isolated from each other in the first direction D1. The bottoms of the dielectric patterns SR may come into direct contact with a top 130t of the insulating film 130. The dielectric patterns SR may include silicon (Si), for example.

Each of the dielectric patterns SR may have a first width W1 in the first direction D1. The widths of the dielectric patterns SR in the first direction D1 may be substantially identical. Each of the dielectric patterns SR may have the second thickness T2. The thicknesses of the dielectric patterns SR may be substantially identical. The second thickness T2 may be smaller than the first thickness T1 of the insulating film 130.

Each of the first and second graphene patterns GR1 and GR2 may be provided on the insulating film 130 between adjacent dielectric patterns SR. From a planar perspective, each of the first and second graphene patterns GR1 and GR2 may have a line form or a bar form. The first and second graphene patterns GR1 and GR2 may be alternately aligned in the first direction D1, and may be extended in parallel in the second direction D2. That is, one of the second graphene patterns GR2 may be provided between the first graphene patterns GR1 adjacent to each other in the first direction D1. One of the first graphene patterns GR1 may be provided between the second graphene patterns GR2 adjacent to each other in the first direction D1. The bottoms of the first and second graphene patterns GR1 and GR2 may come into direct contact with the top 130t of the insulating film 130. Each of the first and second graphene patterns GR1 and GR2 may come into direct contact with both sides of sidewalls SW of the dielectric patterns SR. That is, the dielectric patterns SR and the first and second graphene patterns GR1 and GR2 may fully cover the top 130t of the insulating film 130. The top 130t of the insulating film 130 may not be exposed to the outside.

Each of the first graphene patterns GR1 may have a second width W2 in the first direction D1. Each of the second graphene patterns GR2 may have a third width W3 in the first direction D1. The second width W2 and the third width W3 may be different. For example, the third width W3 may be greater than the second width W2. Since the second width W2 and the third width W3 are different, quasi-bound states in the continuum (qBIC) to be described later may be formed. However, although it has been described that the first width W1 is greater than the second width W2 and is smaller than the third width W3, this is mere for convenience of description and the present disclosure is not limited thereto.

As the difference between the second width W2 and the third width W3 is increased (i.e., as symmetry is broken further), an essential dipole can be created with larger magnitude in forming the optical resonance mode. Each of the second width W2 and the third width W3 may be predetermined so that graphene Plasmon to be described later Fabry-Perot resonates between the dielectric patterns SR.

A thickness of each of the first and second graphene patterns GR1 and GR2 may be smaller than the second thickness T2. Each of the first and second graphene patterns GR1 and GR2 may have a single layer structure (i.e., a monolayer) or a multi-layer structure in which two to ten layers are stacked (i.e., a multi-layer). For example, each of the first and second graphene patterns GR1 and GR2 may have a two-dimensional (2-D) structure.

Two dielectric patterns SR adjacent to each other in the first direction D1 with one of the first graphene patterns GR1 interposed therebetween may form a pair of dielectric patterns SRP. The dielectric pattern pair SRP may be provided in plural. The plurality of dielectric pattern pairs SRP may be isolated from each other in the first direction D1 with one of the second graphene patterns GR2 interposed therebetween. The plurality of dielectric pattern pairs SRP may be periodically aligned in the first direction D1, and may be extended in parallel in the second direction D2. A pitch P of the plurality of dielectric pattern pairs SRP may be defined as the sum of twice the first width W1, the second width W2 and the third width W3 (i.e., P=W1×2+W2+W3).

Hereinafter, a method of satisfying, by the meta surface structure of the optical modulation device according to the present disclosure, ideal conditions for the optical resonance mode for active 2π phase modulation, wherein a trade-off problem occurred and ideal conditions despite the trade-off problem are described in detail.

First, the ideal conditions for the optical resonance mode for active 2π phase modulation and the trade-off problem occurring in this case are described. In the optical resonance mode of the optical modulation device according to the present disclosure, a phase may have a range of 0 to 2π on the basis of a resonant frequency.

When light resonates on a meta surface, a full width at half maximum (FWHM) of a resonance spectrum may be increased (i.e., a resonant spectrum may become relatively broad and blunt) as the energy loss of the resonance is increased, but the FWHM may be reduced (i.e., a resonant spectrum may become narrow and sharp) as the energy loss is reduced. If the FWHM is small, the required sweeping range of the resonant frequency with respect to the reference frequency (i.e., a measured frequency) for attaining a phase difference (between the incident light and the re-radiated light from the meta surface) of 0 to 2π is reduced. As the FWHM is increased, the phase difference (and therefore the phase of the reflected light) may cover the span of 0 to 2π only when the resonant frequency sweeps across the reference frequency with a range that is equal to or larger than the resonance's FWHM.

Given a predetermined reference frequency, in order to measure a phase change from 0 to 2π, the following two conditions (the first condition and the second condition) need to be satisfied. The first condition is to greatly change a resonant frequency in an active manner. The second condition is to reduce the FWHM of a resonant spectrum (i.e., to minimize the energy loss of a resonance).

However, a trade-off problem occurs in the process. An optical resonance is the vibration of charges within the optical structure. In order to increase the active tuning range of the resonance frequency, more electrons need to be put into the meta surface structure (i.e., increase the electron (negative charges) density of the meta surface) or more drained (i.e., increase the hole (positive charges) density of the meta surface). And this larger accumulation of charge carriers inevitably increases the energy loss of the resonance (i.e., the FWHM of a resonant spectrum is inevitably increased).

The aforementioned contents are mathematically described. First, the frequency shift of a resonance ($\Delta\omega_n$) is given as Equation 1.

$$\Delta\omega_n = -\frac{\omega_n}{2} \frac{\int d^3\vec{r} \Delta\varepsilon(\vec{r})|E(\vec{r})|^2}{\int d^3\vec{r}\, \varepsilon(\vec{r})|E(\vec{r})|^2} \quad \text{[Equation 1]}$$

The FWHM is proportional to the dissipative loss rate ($1/\tau_d$) given as Equation 2.

$$\frac{1}{\tau_d} = \frac{\omega_n}{2} \frac{\int d^3\vec{r}\, \text{Im}[\varepsilon(\vec{r})]|E(\vec{r})|^2}{\int d^3\vec{r}\, \varepsilon(\vec{r})|E(\vec{r})|^2} \quad \text{[Equation 2]}$$

In order to greatly change a resonant frequency, in Equation 1, the numerator needs to be increased, and the denominator needs to be decreased. In order to reduce the FWHM of a resonant spectrum (i.e., in order for the resonant spectrum to become narrow and sharp), in Equation 2, the numerator needs to be decreased and the denominator needs to be increased. First, since the denominator in Equations 1 and 2 are the same, decreasing the denominator in Equation 1 and increasing the denominator in Equation 2 cannot be simultaneously achieved. Furthermore, in order to increase the numerator in Equation 1, the charge density of the system needs to be greatly changed. But this also increases the numerator in Equation 2, and therefore increasing the numerator in Equation 1 and decreasing the numerator in Equation 2 cannot be simultaneously achieved. That is, it is difficult to simultaneously satisfy the first condition and the second condition.

To simultaneously satisfy the first condition and the second condition (i.e., to solve the trade-off problem) is one of the ideal conditions for the optical resonance mode for active 2π phase modulation.

Separately from such a case, in order to constantly maintain amplitude simultaneously with phase control, the depth of the resonance spectrum needs to change accordingly as the resonant frequency is actively modulated. The amplitude of the reflected (or transmitted) light can be maintained at a constant value when the depth of a resonance becomes shallow at the moment the resonant frequency is identical with a reference frequency (i.e., the moment when the resonant frequency passes through the reference frequency). In the case of a meta surface for reflection, the depth of a resonance (or the depth of reflectivity (or reflectivity) R) is given as Equation 3 below.

$$R = |r|^2 = 1 - 4\frac{\gamma_r \gamma_d}{(\gamma_r + \gamma_d)^2} = 1 - \frac{4p}{(p+1)^2}, p = \gamma_r/\gamma_d \quad \text{[Equation 3]}$$

wherein $\gamma_r$ is a radiation loss rate. $\gamma_d$ is an internal dissipative loss rate. More specifically, $\gamma_r$ is a measure of how well the incident light is coupled with a resonance. $\gamma_d$ indicates the energy loss of a resonance.

From Equation 3, it may be seen that a control parameter $$P = \gamma_r/\gamma_d$$

need to be well adjusted in order to well adjust the depth (or reflectivity) R of a resonance. It can be seen that there is a limit to the adjustment of $\gamma_d$ because $\gamma_d$ is greatly related to a characteristic of a substance and thus $\gamma_r$ needs to be able to be adjusted.

To constantly maintain amplitude while actively controlling the phase is another of the ideal conditions needed for the optical resonance mode for active 2π phase modulation. To constantly maintain the amplitude may be denoted as a third condition. As a result, for the purpose of active 2π phase modulation, the optical resonance mode needs to simultaneously satisfy the first condition, the second condition and the third condition.

A phase modulation method using the optical modulation device according to the present disclosure can satisfy the ideal conditions for the optical resonance mode by using two resonances and an avoided crossing phenomenon of the two resonances. That is, the phase modulation method using the optical modulation device according to the present disclosure can solve the trade-off problem and constantly maintain amplitude by using the two resonances and the avoided crossing phenomenon of the two resonances. In this case, the avoided crossing phenomenon means a phenomenon in which when two different resonances approach each other (i.e., when resonant frequencies of the different resonances become similar), one resonance "pushes" the other resonance while the resonant frequencies move without overlapping.

More specifically, the phase modulation method using the optical modulation device according to the present disclosure uses the avoided crossing phenomenon between a first resonance that satisfies the first condition (i.e., a resonant frequency is actively greatly changed) and a second resonance that satisfies the second condition (i.e., the FWHM of a resonant spectrum is small). The first resonance may be denoted as a fast-moving resonance, and the second resonance may be denoted as a narrow resonance. In order for the avoided crossing phenomenon to occur, a distribution of electric fields of the first resonance and a distribution of electric fields of the second resonance may be at least partially overlapped. Mathematically, the first resonance and the second resonance may satisfy Equation 4 below.

$$v = k\int \vec{E}_1 \cdot \vec{E}_2 dv > 0 \quad \text{[Equation 4]}$$

wherein $$\vec{E}_1$$

is an electric field vector of the first resonance.

$$\vec{E}_2$$

is an electric field vector of the second resonance. k is a constant. For a more excellent modulation performance, a value v is greater than 0 and may have a predetermined value.

The first resonance may "push" the second resonance aside and thereby allow the second resonance's frequency to rapidly cross the reference frequency. In this case, the first condition and the second condition can be simultaneously satisfied (i.e., the trade-off problem can be solved).

The first resonance may be graphene Plasmon, for example. The nature of the graphene plasmon on graphene, that is, a 2-D substance, may allow for a very small the denominator in Equation 1 due to the graphene plasmon's small mode volume, and may make great the numerator in Equation 1 as the 2-D graphene allows for its charge density to be rapidly changed. That is, the graphene plasmon may be used as the fast-moving resonance because it can maximize Equation 1.

The second resonance may be quasi-bound states in the continuum (qBIC), for example. That is, the qBIC may be used in the narrow resonance.

When light is incident on the meta surface of the optical modulation device according to the present disclosure, multi-poles (chiefly dipoles) are formed within each of the dielectric patterns SR or between the dielectric patterns SR. The light may be emitted to the outside as the multi-poles are vibrated. Bound states in the continuum (BIC) indicates a mode in which electromagnetic waves emitted to the outside by multi-poles are cancelled due to interference from one another by symmetry, preventing light from being emitted to the outside. That is, if the BIC is formed, although light is incident on the meta surface, light reflected to the outside may not be affected (i.e., a phase may not be modulated). Accordingly, in order to modulate the phase of the emitted light, the symmetry needs to be broken. To break the symmetry may be performed by changing a structural variable. For example, the symmetry may be broken by making different the widths of the first and second graphene patterns GR1 and GR2 provided between the dielectric patterns SR. The qBIC means a mode in which the symmetry is broken and light is emitted to the outside by the resonance. If the qBIC is used, a degree of the multi-pole formation within the meta surface may be adjusted through the structural variable. Furthermore, the qBIC may help amplitude to be constantly maintained (i.e., to satisfy the third condition).

The optical modulation device according to the present disclosure may be used in various applications, such as spectroscopy using a mid-infrared spectrum, the security industry, and academic fields such as chemistry, biochemistry and ecology, in addition to wavefront shaping, holography, and invisibility cloaks because the optical modulation device enables actively a or more phase modulation while maintaining uniform amplitude.

Figure 2A:
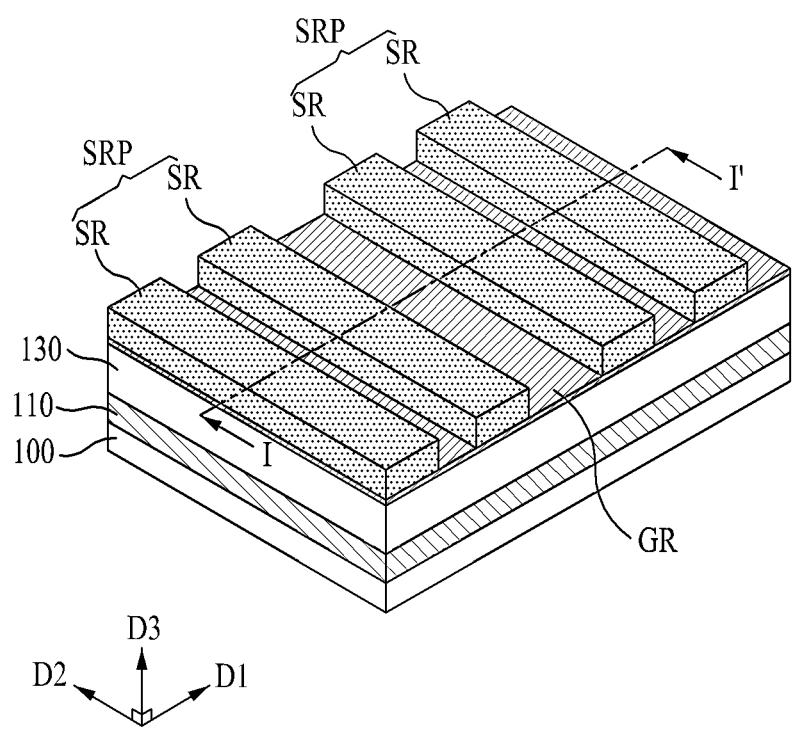
FIG. 2A is a perspective view for describing an optical modulation device according to a comparison example.
Figure 2B:
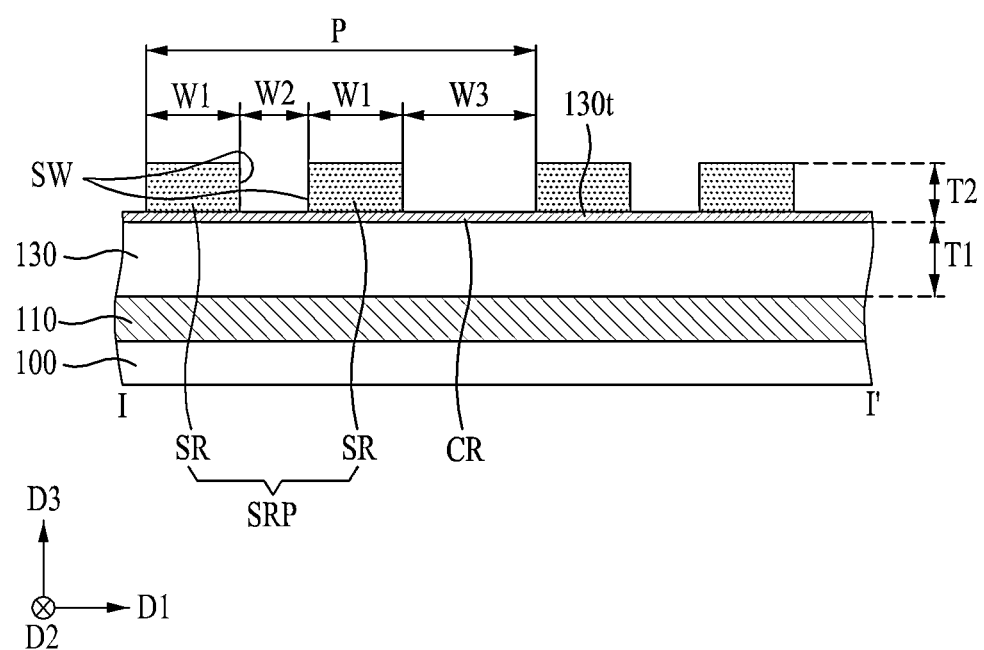
FIG. 2B is a cross-sectional view for describing the optical modulation device according to the comparison example, and corresponds to a cross section taken along line I-I' in FIG. 2A.

FIG. 2A is a perspective view for describing an optical modulation device according to a comparison example. FIG. 2B is a cross-sectional view for describing the optical modulation device according to the comparison example, and corresponds to a cross section taken along line I-I' in FIG. 2A. Hereinafter, for convenience of description, a description of substantially the same contents as those described with reference to FIGS. 1A and 1B is omitted, and differences are described in detail.

Referring to FIGS. 2A and 2B, a graphene layer GR may be provided on an insulating film 130. The graphene layer GR may fully cover a top 130t of the insulating film 130. A plurality of dielectric patterns SR may be provided on the graphene layer GR. The graphene layer GR may be interposed between the dielectric patterns SR and the insulating film 130. The dielectric patterns SR may not come into direct contact with the insulating film 130. The graphene layer GR may not come into contact with sidewalls SW of the dielectric patterns SR. However, a method of aligning the dielectric patterns SR may be substantially identical with the method described with reference to FIGS. 1A and 1B.

The optical modulation device according to the comparison example described with reference to FIGS. 2A and 2B may use qBIC, but is different from the optical modulation device according to an embodiment of the present disclosure, described with reference to FIGS. 1A and 1B, in that the optical modulation device according to the comparison example cannot use the avoided crossing phenomenon.

Figure 3A:
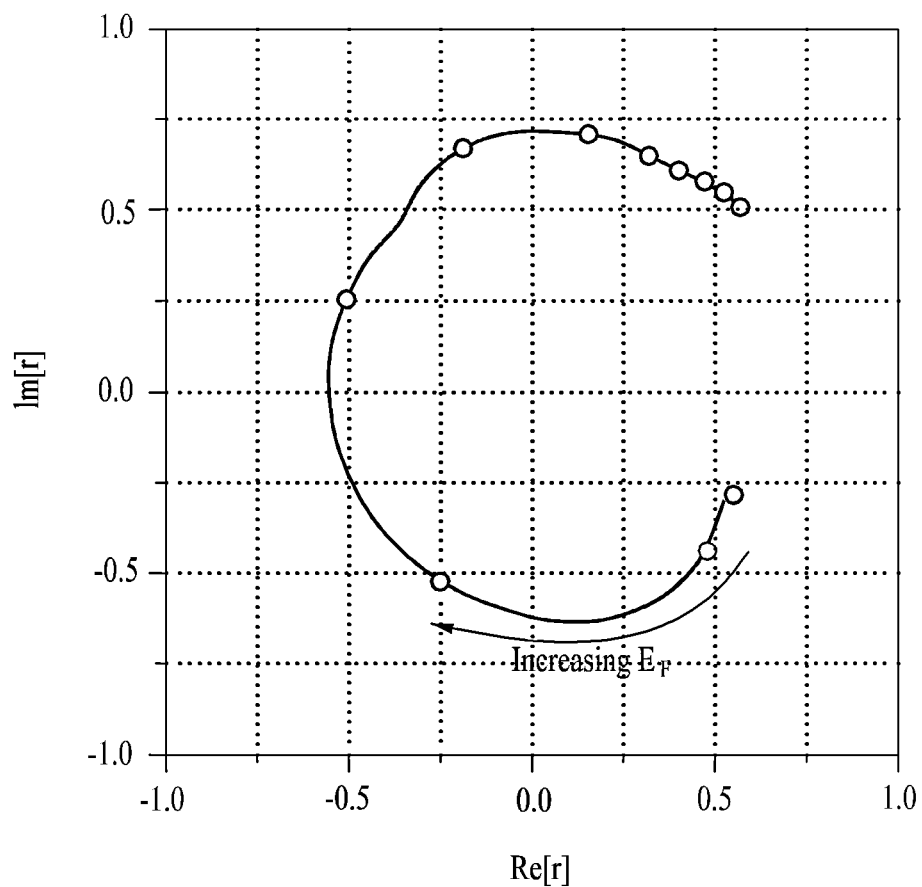
FIGS. 3A, 3B and 3C are diagrams for describing phase modulation using the optical modulation device illustrated in FIGS. 2A and 2B.
Figure 3B:
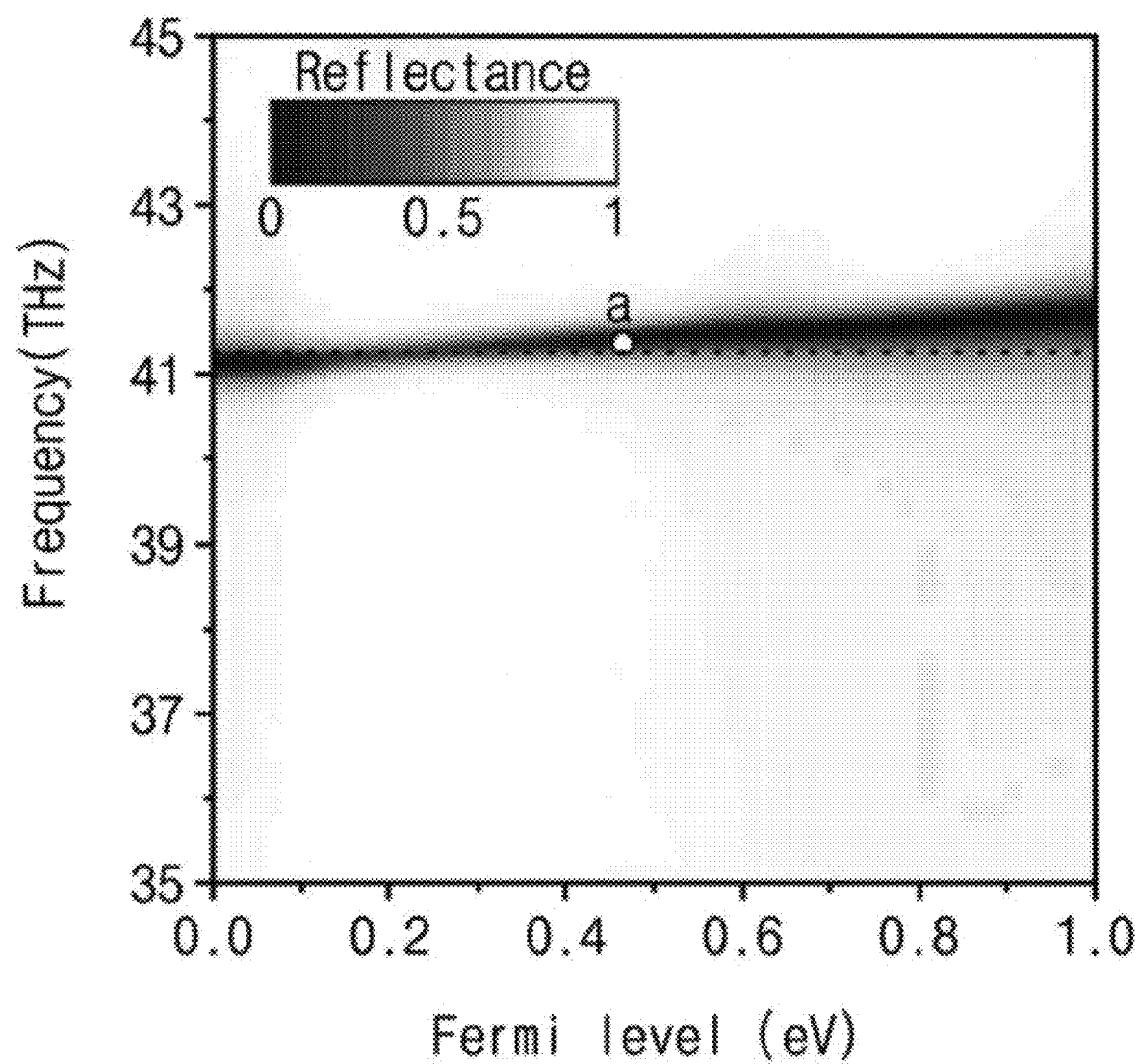
Figure 3C:
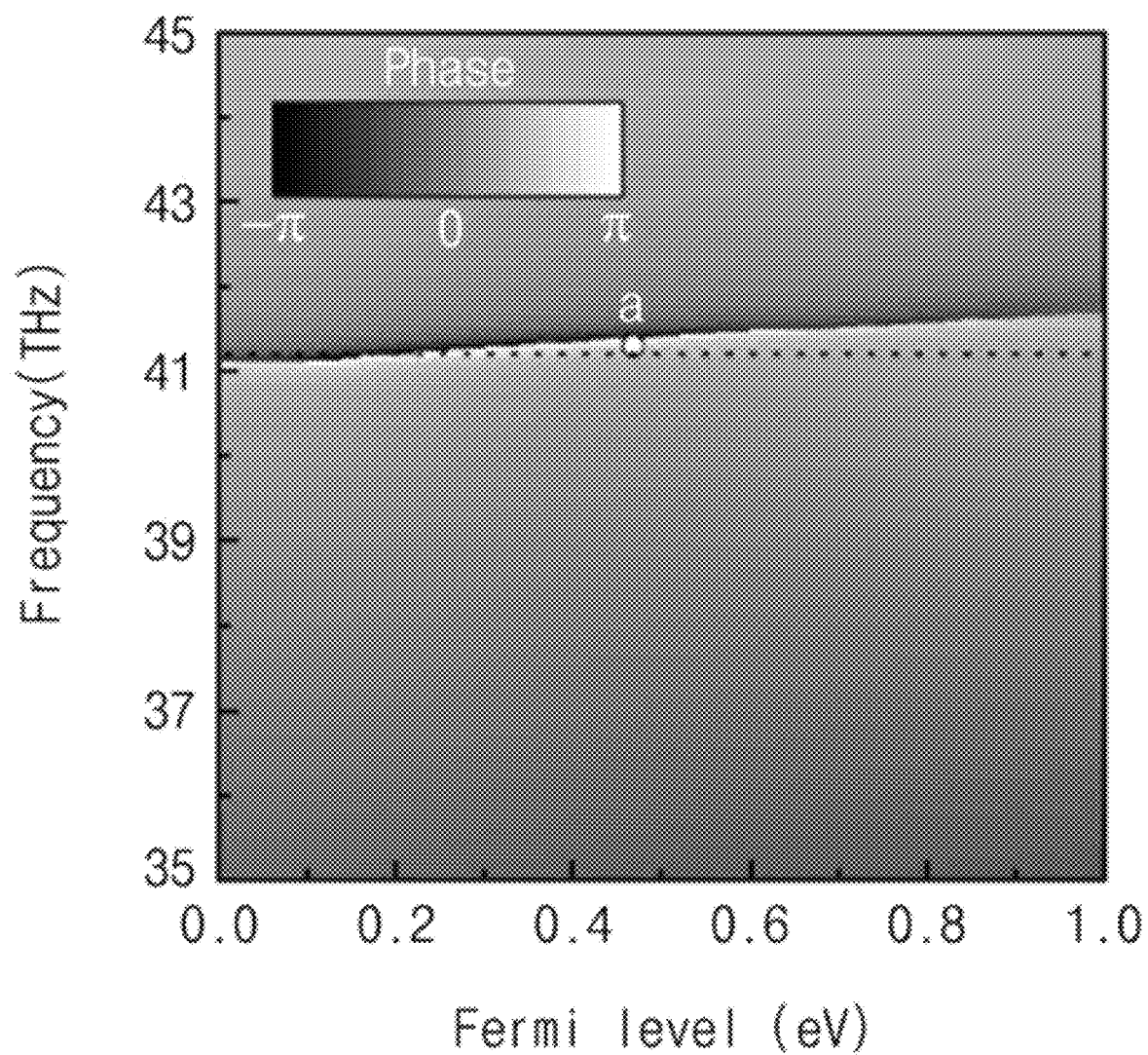
Figure 4A:
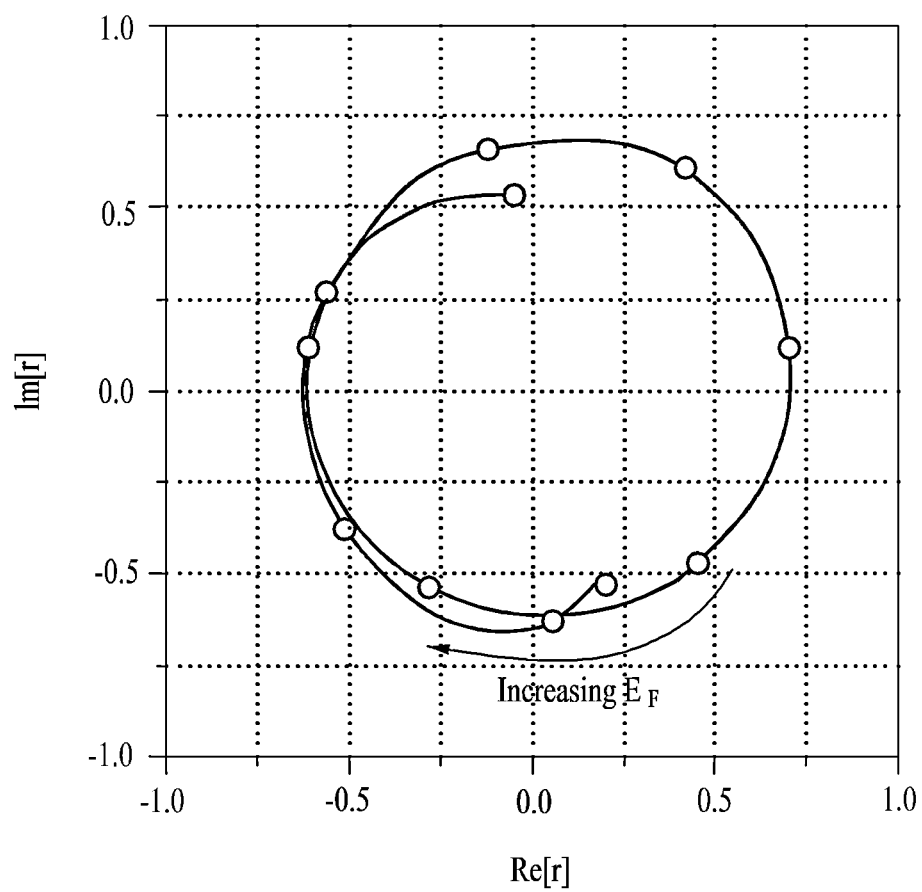
FIGS. 4A, 4B and 4C are diagrams for describing phase modulation using the optical modulation device according to an embodiment of the present disclosure.
Figure 4B:
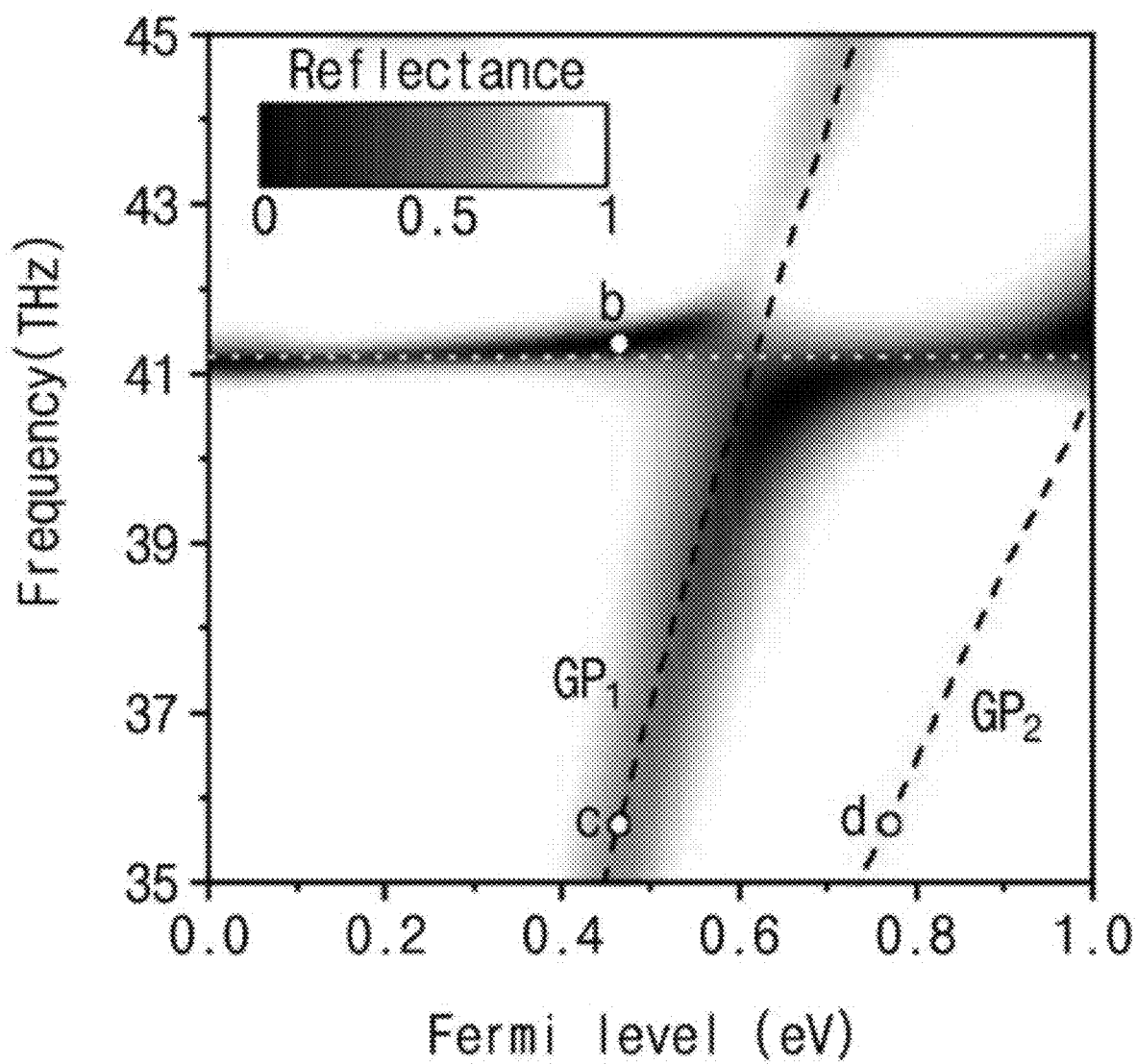
Figure 4C:
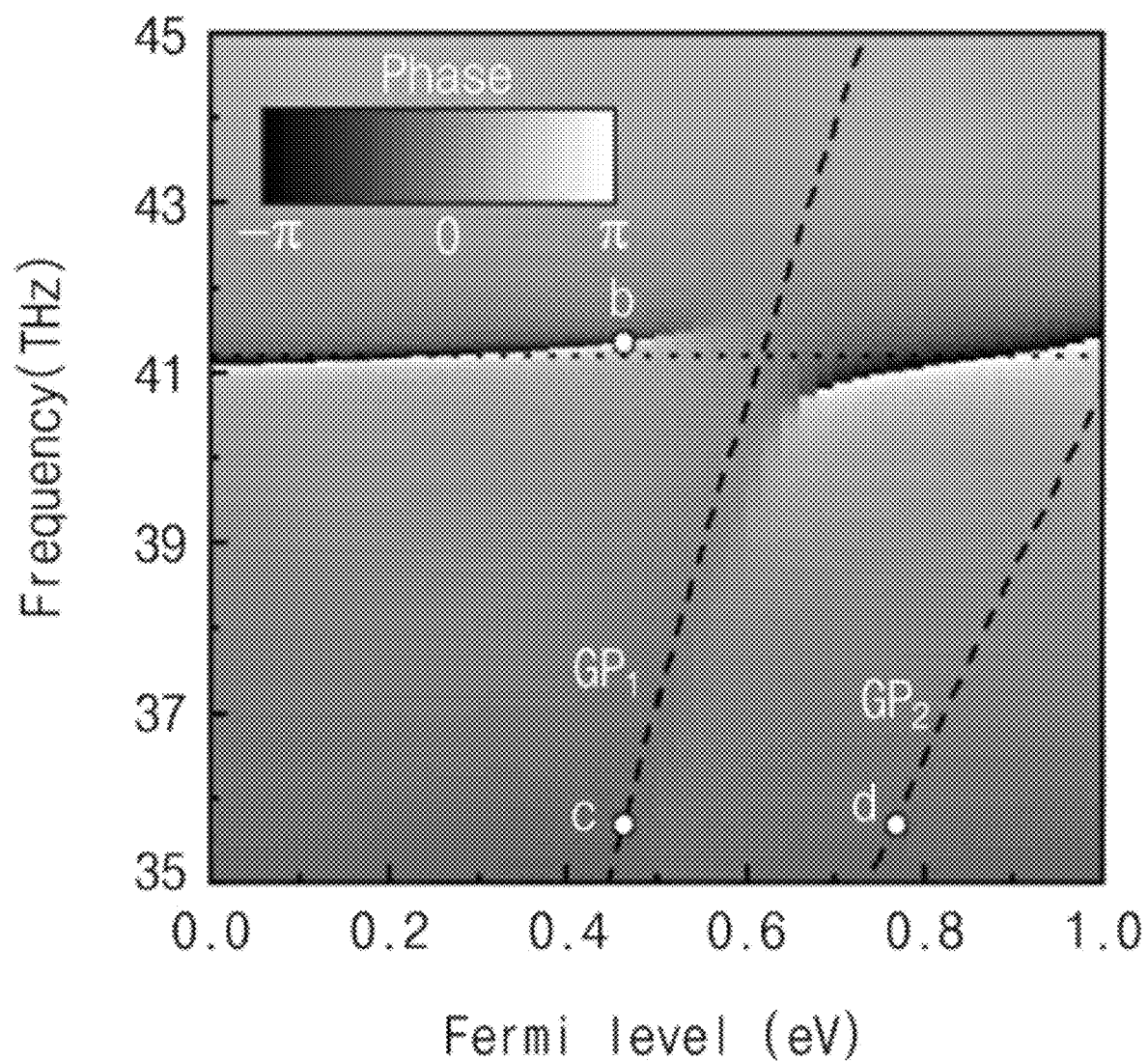

FIGS. 3A, 3B and 3C are diagrams for describing phase modulation using the optical modulation device illustrated in FIGS. 2A and 2B. FIGS. 4A, 4B and 4C are diagrams for describing phase modulation using the optical modulation device according to an embodiment of the present disclosure. More specifically, FIGS. 3A and 4A are graphs in which the results of phase modulation according to a change (from 0 eV to 1 eV) in the Fermi level are illustrated on a complex plane. In the graphs, a transverse axis indicates a real part of complex amplitude "r", and a longitudinal axis indicates an imaginary part of the complex amplitude "r." FIGS. 3B and 4B are graphs illustrating a change in reflectivity for a Fermi level and a frequency. A unit in the transverse axis is eV, a unit in the longitudinal axis is THz, and the reflectivity has a value of 0 to 1. FIGS. 3C and 4C are graphs illustrating a change in the phase for a Fermi level and a frequency. A unit in the transverse axis is eV, a unit in the longitudinal axis is THz, and the phase has a value of $-\pi$ to $\pi$. A straight line that passes through a point "a" in FIGS. 3B and 3C and a straight line that passes through a point "b" in FIGS. 4B and 4C indicate qBIC. Straight lines $GP_1$ and $GP_2$ that pass through a point "c" and a point "d", respectively, in FIGS. 4B and 4C indicate two different graphene plasmons.

First, referring to FIGS. 1B and 2B, FIGS. 3A to 3C and FIGS. 4A to 4C illustrate results measured using the optical modulation device designed to have the first width W1 of about 2480 nm, the second width W2 of about 40 nm, the third width W3 of about 320 nm, the pitch P of about 5320 nm, the first thickness T1 of about 640 nm, and the second thickness T2 of about 160 nm. However, this is merely an example of an optimized design, and an optical modulation device according to the present disclosure is not limited to the numerical values.

When comparing and referring to FIGS. 3A and 4A, the optical modulation device according to the comparison example does not implement complete $2\pi$ phase modulation, whereas the optical modulation device according to an embodiment of the present disclosure can implement phase modulation close to about $3\pi$. Accordingly, it can be seen that sufficient excitation of graphene plasmons and the avoided crossing phenomenon need to be used for complete $2\pi$ phase modulation.

When comparing and referring FIGS. 3B and 4B or FIGS. 3C and 4C, unlike in the comparison example, it can be seen that the avoided crossing phenomenon occurs in the optical modulation device according to embodiments of the present disclosure.

Figure 5A:
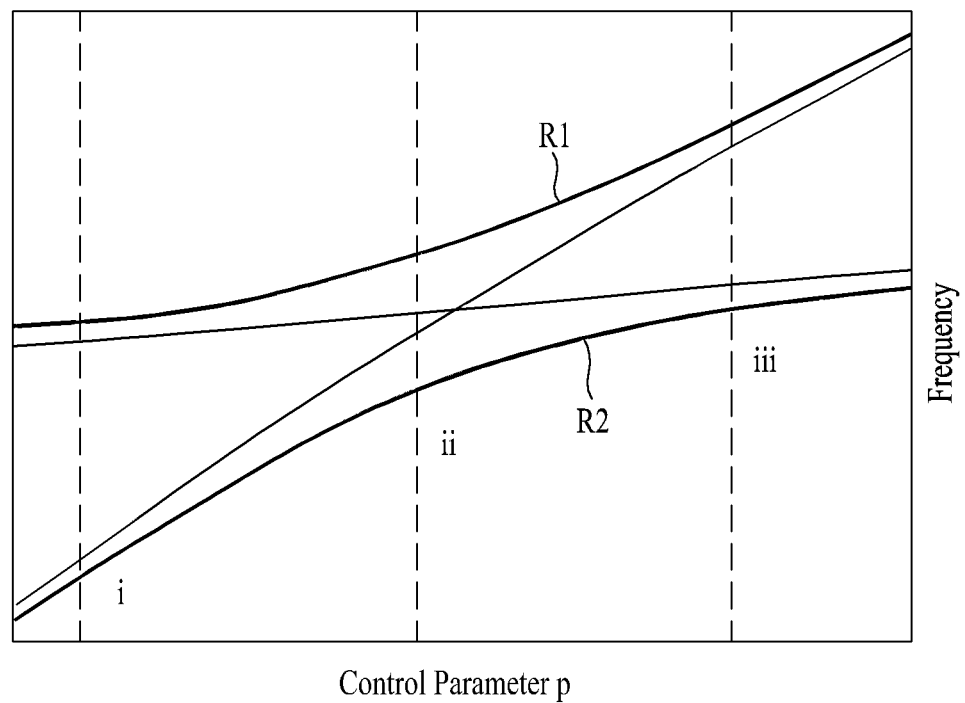
FIGS. 5A, 5B and 5C are graphs for describing a phase modulation method using the optical modulation device according to an embodiment of the present disclosure.
Figure 5B:
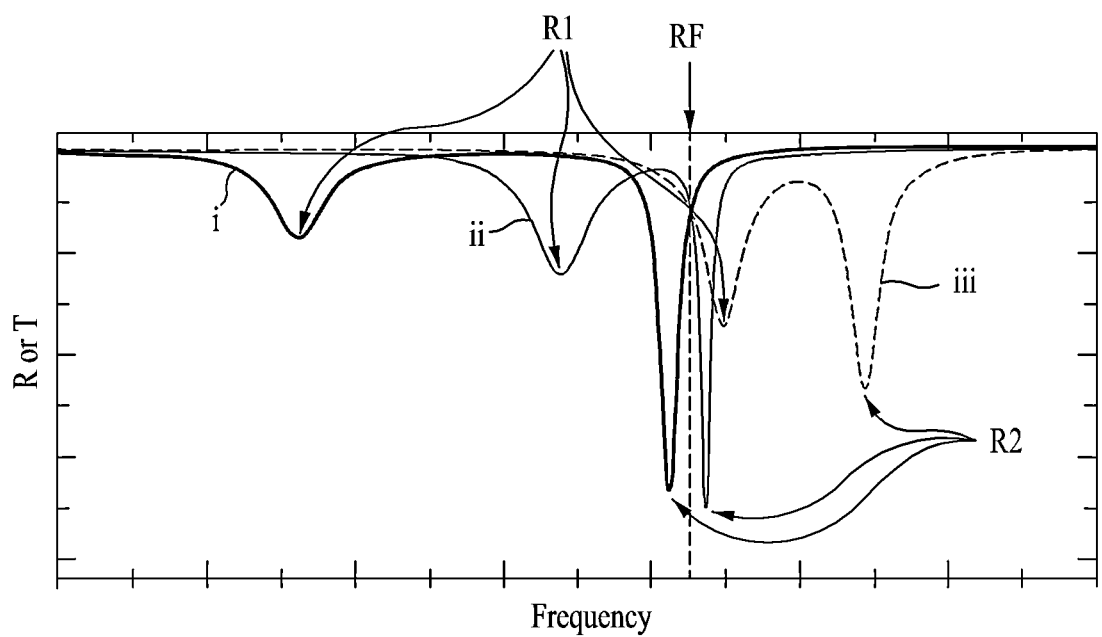
Figure 5C:
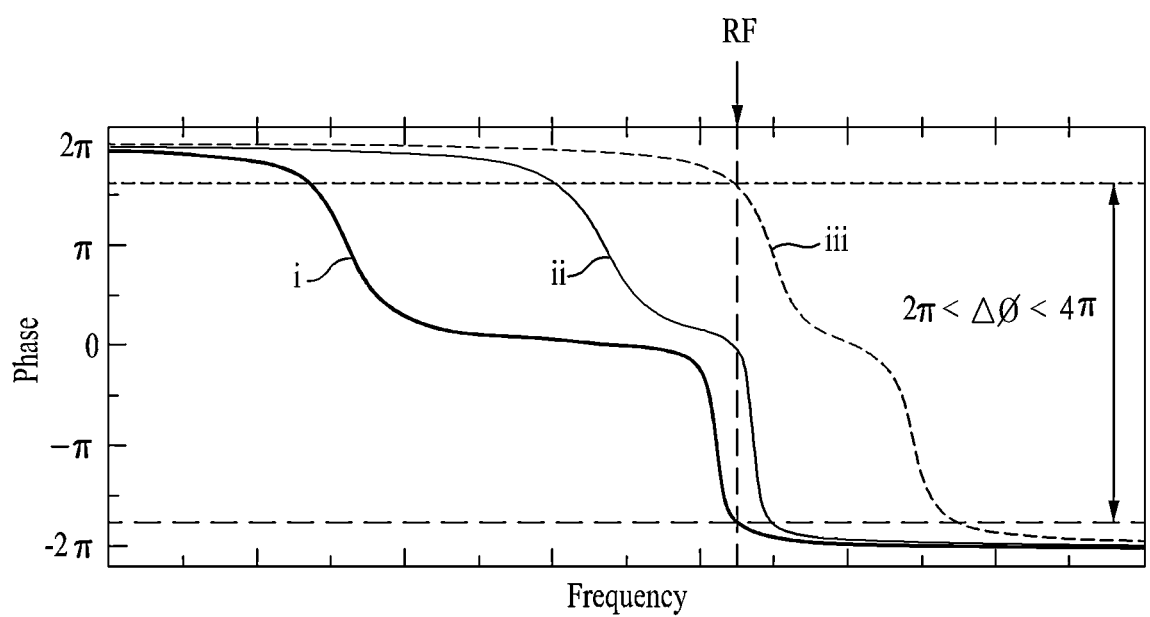

FIGS. 5A, 5B and 5C are graphs for describing the avoided crossing phenomenon used in a phase modulation method using the optical modulation device according to an embodiment of the present disclosure. More specifically, FIG. 5A is a graph illustrating changees in the resonance frequencies according to the control parameter P. FIG. 5B is a graph illustrating reflectivity R (or transmissivity T) with respect to the frequency. FIG. 5C is a graph illustrating the reflected phase changes with respect to the frequency. The phase has a value of $-2\pi$ to $2\pi$.

Referring to FIG. 5A, as the control parameter P is changed from a first value (i) to a third value (iii) via a second value (ii), avoided crossing may occur between the first resonance R1 and the second resonance R2. The first resonance R1 may correspond to the aforementioned fast-moving resonance. The second resonance R2 may correspond to the aforementioned narrow resonance.

Referring to FIG. 5B, as the control parameter P is changed from the first value (i) to the second value (ii), the first resonance R1 and the second resonance R2 may become close to each other in the frequency axis. Furthermore, as the control parameter P is changed from the second value (ii) to the third value (iii), the first resonance R1 and the second resonance R2 may become close to each other in the frequency axis. As the first resonance R1 "pushes" the second resonance R2, the second resonance R2 may rapidly cross over the reference frequency RF, and the aforementioned trade-off problem can be solved.

Referring to FIG. 5C, a change in the phase in the reference frequency ($\Delta\varphi$), may be $2\pi$ or more. More specifically, a change in the phase in the reference frequency ($\Delta\varphi$), may be $2\pi$ to $4\pi$.

Figure 6A:
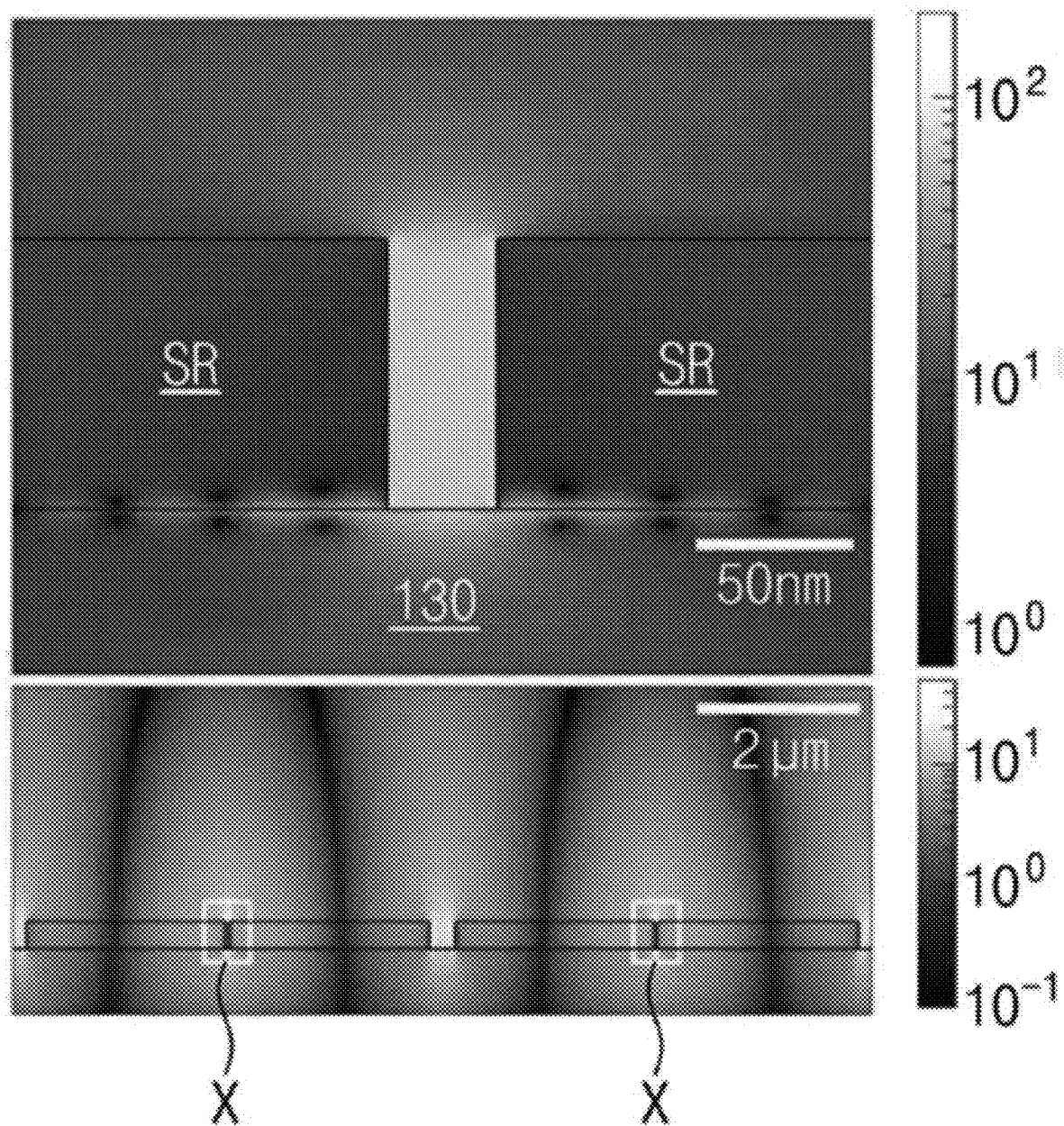
FIG. 6A is a diagram for describing a distribution of electric fields upon phase modulation using the optical modulation device illustrated in FIGS. 2A and 2B, and illustrates a distribution of electric fields at a point "a" in FIGS. 3B and 3C.
Figure 6B:
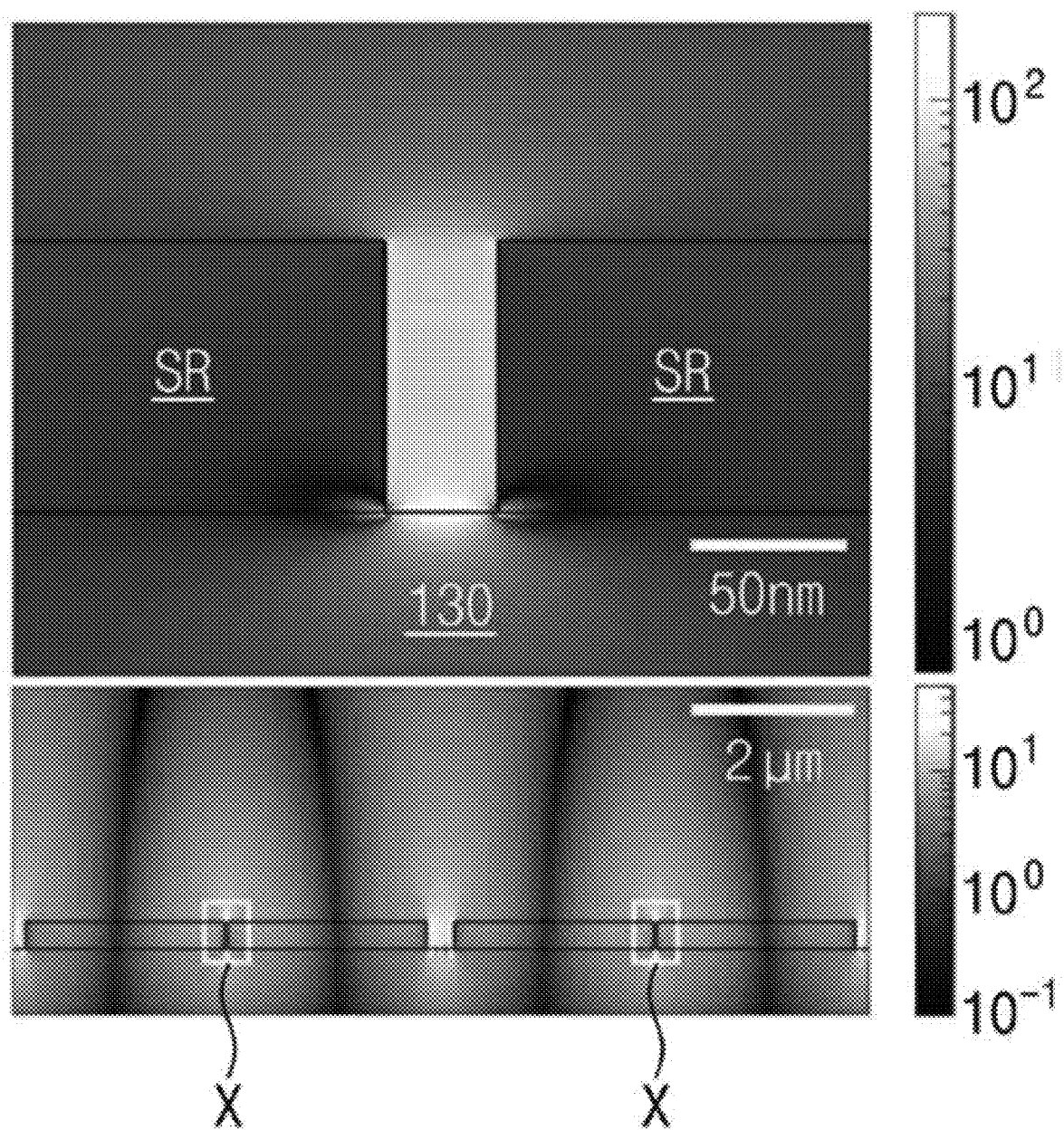
FIGS. 6B, 6C and 6D are diagrams for describing distributions of electric fields upon phase modulation using the optical modulation device according to an embodiment of the present disclosure, and illustrate a distribution of electric fields at points "b", "c" and "d" in FIGS. 4B and 4C.
Figure 6C:
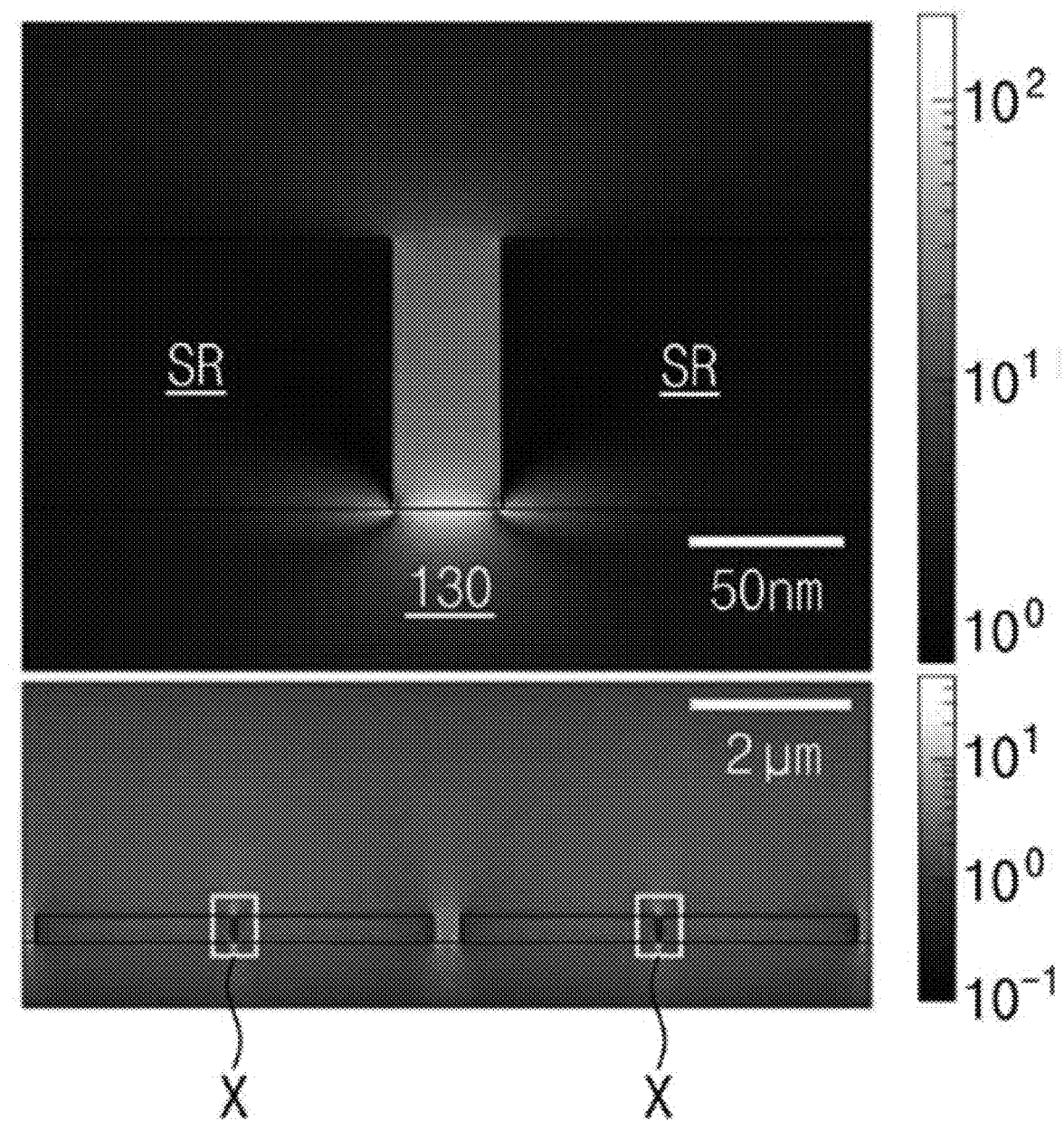
Figure 6D:
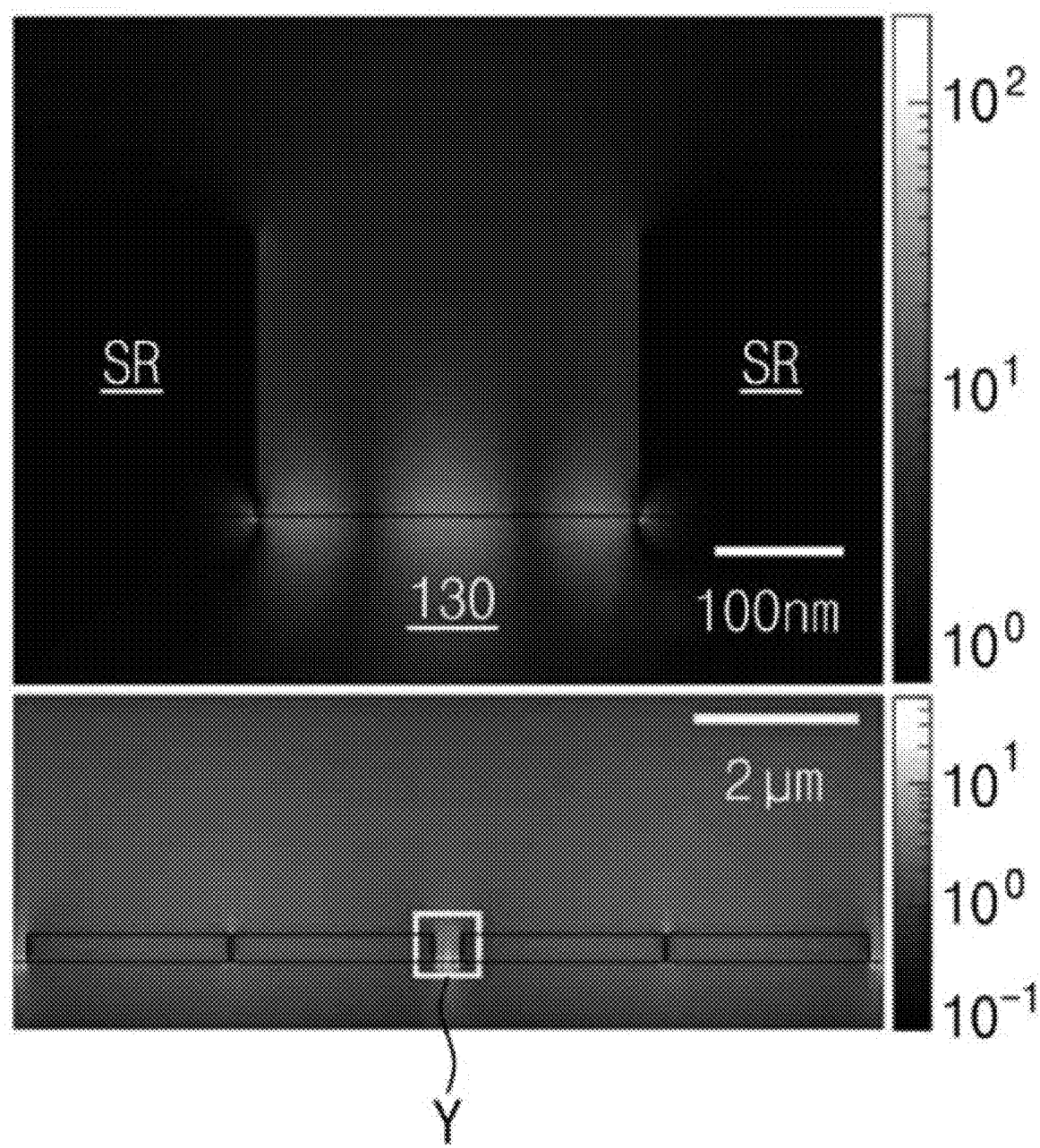

FIG. 6A is a diagram for describing a distribution of electric fields upon phase modulation using the optical modulation device illustrated in FIGS. 2A and 2B, and illustrates a distribution of electric fields at the point "a" in FIGS. 3B and 3C. FIGS. 6B, 6C and 6D are diagrams for describing distributions of electric fields upon phase modulation using the optical modulation device according to an embodiment of the present disclosure, and illustrate distributions of electric fields at the points "b", "c" and "d" in FIGS. 4B and 4C. More specifically, in FIGS. 6A to 6D, a longitudinal axis is $\log|E_x/E_o|$. A refractive index of the insulating film 130 may be about 2. Furthermore, also referring to FIG. 1B or 2B, FIGS. 6A, 6B and 6C illustrate a magnified view of the region X, that is, the space between the dielectric patterns SR corresponding to the second width W2. FIG. 6D illustrate a magnified view of the region Y, that is, the space between the dielectric patterns SR corresponding to the third width W3.

Referring to FIG. 6A, it can be seen that graphene plasmon and qBIC coexist even in the optical modulation device according to the comparison example. A distribution of repetitive electric fields illustrated under the dielectric patterns SR corresponds to graphene Plasmon. A distribution of electric fields illustrated on the sidewalls of the dielectric patterns SR corresponds to qBIC.

When comparing FIGS. 6B and 6C with FIG. 6A and referring to FIGS. 6A, 6B and 6C, it can be seen that graphene plasmon and qBIC coexist even in the optical modulation device according to an embodiment of the present disclosure, and an electric field between the dielectric patterns SR corresponding to the graphene Plasmon in FIGS. 6B and 6C is greater than an electric field corresponding to the graphene Plasmon in FIG. 6A. For reference, referring to FIGS. 6C and 6D, it can be seen that the first graphene plasmon $GP_1$ corresponding to the point "c" is chiefly excited at the bottom of the space between the dielectric patterns SR and the second graphene plasmon $GP_2$ corresponding to the point "d" is chiefly excited on the sidewall of each of the dielectric patterns SR.

Figure 7A:
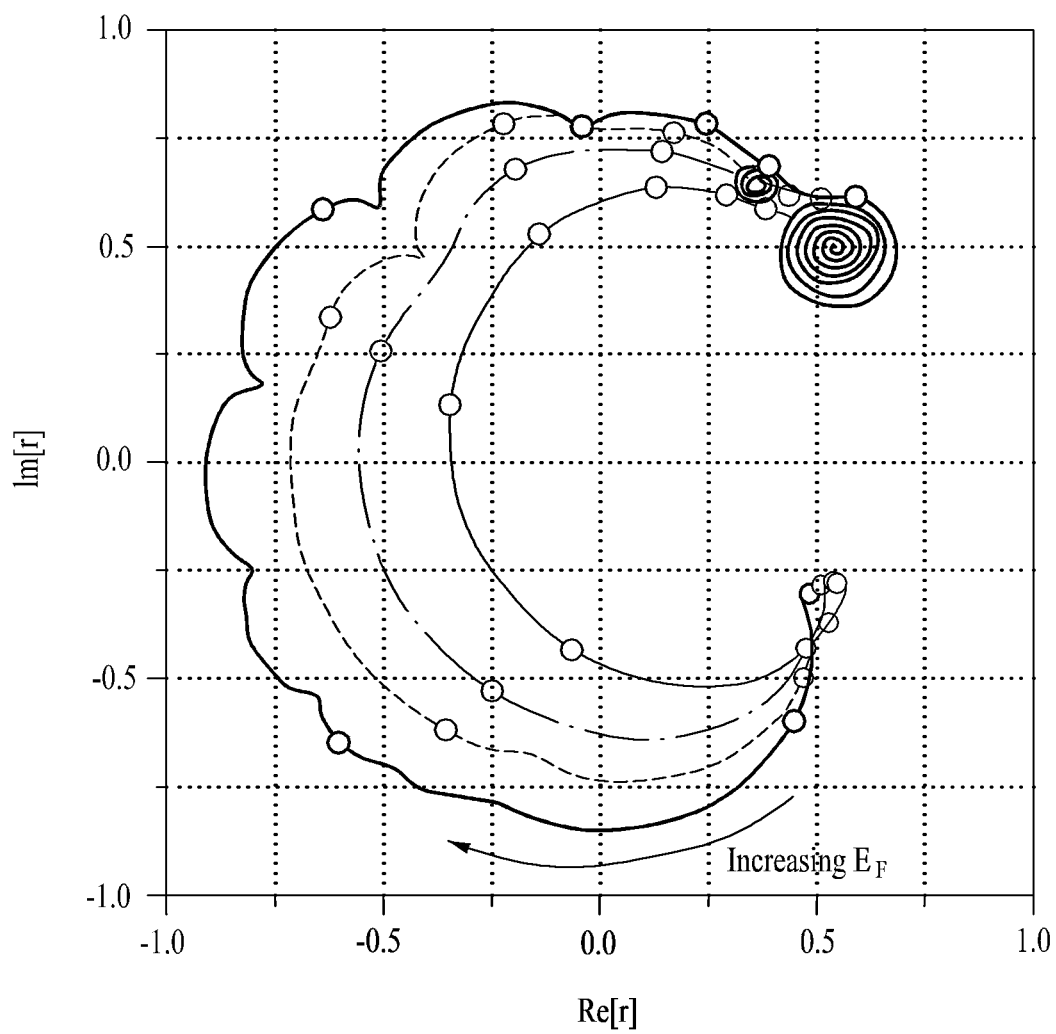
FIG. 7A is a diagram for describing mobility dependency of phase modulation using the optical modulation device illustrated in FIGS. 2A and 2B.
Figure 7B:
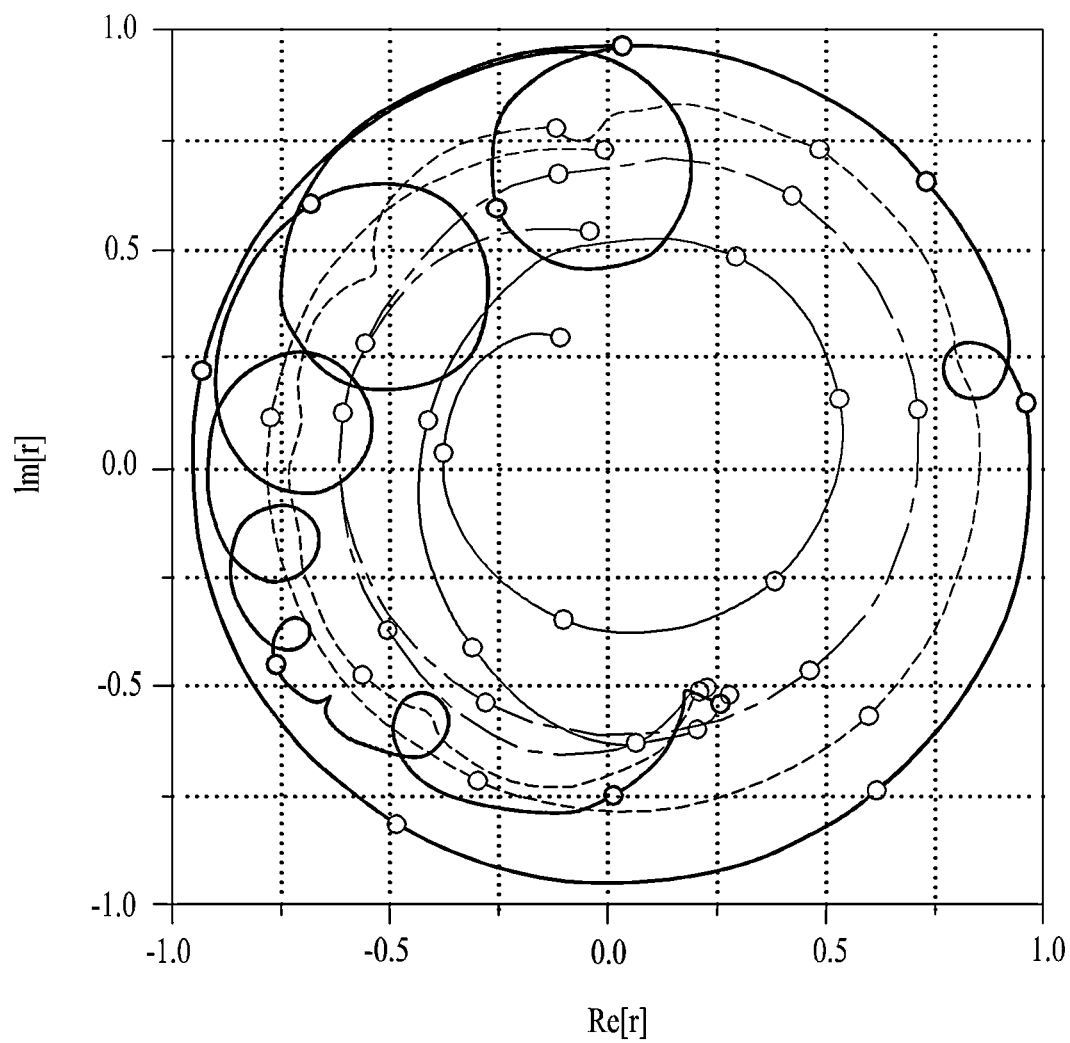
FIG. 7B is a diagram for describing mobility dependency of phase modulation using the optical modulation device according to an embodiment of the present disclosure.

FIG. 7A is a diagram for describing dependency of phase modulation on graphene mobility ($\mu_s$) using the optical modulation device illustrated in FIGS. 2A and 2B. FIG. 7B is a diagram for describing dependency of phase modulation on graphene mobility ($\mu_s$) using the optical modulation device according to an embodiment of the present disclosure. More specifically, FIGS. 7A and 7B are graphs in which the results of phase modulation according to a change in a Fermi level and a change in the graphene mobility ($\mu_s$) are illustrated on a complex plane. In FIGS. 7A and 7B, a transverse axis indicates a real part of complex amplitude "r", and a longitudinal axis indicates an imaginary part of the complex amplitude "r."

Referring to FIGS. 7A and 7B, as the graphene mobility ($\mu_s$) is increased, an absolute value of the complex amplitude "r" may be commonly increased. Furthermore, as may be seen from FIGS. 3A and 4A, the optical modulation device according to the comparison example does not implement complete $2\pi$ phase modulation, whereas the optical modulation device according to an embodiment of the present disclosure can implement phase modulation close to about $3\pi$. Accordingly, it can be seen that sufficient excitation of graphene Plasmon and the avoided crossing phenomenon need to be used for complete $2\pi$ phase modulation.

Figure 8:
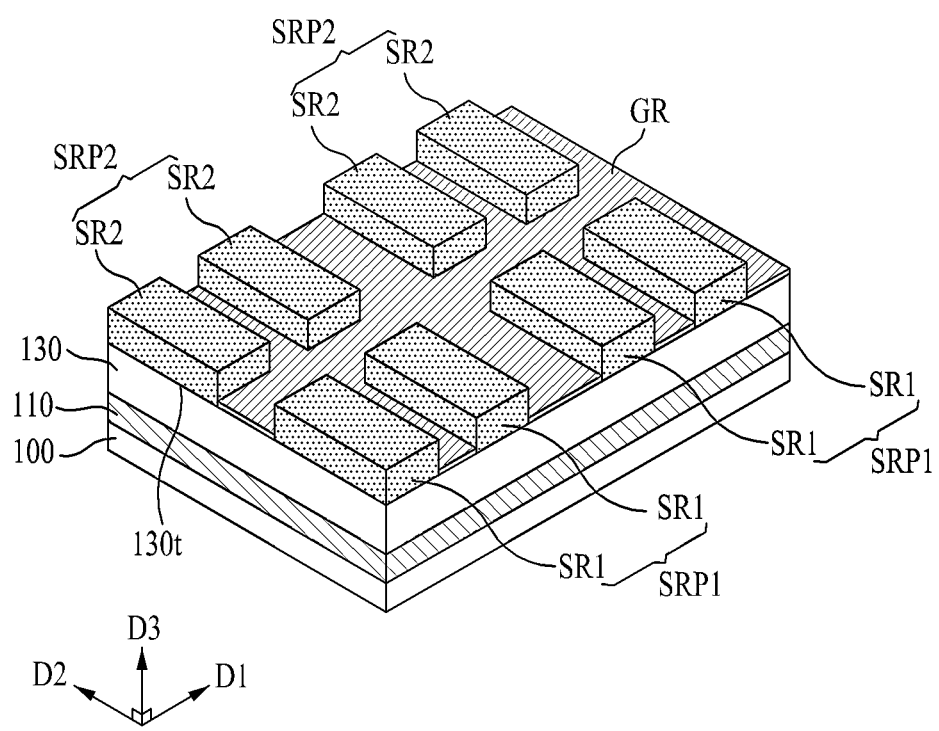
FIG. 8 is a perspective view for describing an optical modulation device according to another embodiment of the present disclosure.

FIG. 8 is a perspective view for describing an optical modulation device according to another embodiment of the present disclosure. Hereinafter, for convenience of description, a description of substantially the same contents as those described with reference to FIGS. 1A and 1B is omitted, and differences are described in detail.

Referring to FIG. 8, first dielectric patterns SR1 and second dielectric patterns SR2 may be provided on an insulating film 130. The first dielectric patterns SR1 are aligned in a first direction D1, and may be isolated from each other in the first direction D1. The second dielectric patterns SR2 may also be aligned in the first direction D1, and may be isolated from each other in the first direction D1. Every two of the first patterns SR1 may form a first dielectric pattern pair SRP1. Every two of the second dielectric patterns SR2 may form a second dielectric pattern pair SRP2. A method of aligning the first dielectric patterns SR1 (or the first dielectric pattern pair SRP1) in the first direction D1 and a method of aligning the second dielectric patterns SR2 (or the second dielectric pattern pair SRP2) in the first direction D1 may be substantially the same as the method of aligning the dielectric patterns SR in the first direction D1, which has been described with reference to FIGS. 1A and 1B. Each of the first dielectric patterns SR1 may face any one of the second dielectric patterns SR2 in a second direction D2. The first dielectric patterns SR1 and the second dielectric patterns SR2 that face each other in the second direction D2 may be isolated from each other in the second direction D2.

A graphene layer GR may cover a top 130t of the insulating film 130 exposed by the first and second dielectric patterns SR1 and SR2. The top 130t of the insulating film 130 may be fully covered by the first and second dielectric patterns SR1 and SR2 and the graphene layer GR. The optical modulation device described with reference to FIG. 8 may modulate a phase of a light polarized in the second direction D2 in addition to a phase of light polarized in the first direction D1.

Despite embodiments of the optical modulation device described in this specification, the optical modulation device according to the present disclosure is not limited to a specific structure, and may have various structures designed to satisfy the ideal conditions for the optical resonance mode by using two resonances and the avoided crossing phenomenon of the two resonances.

Figure 9:
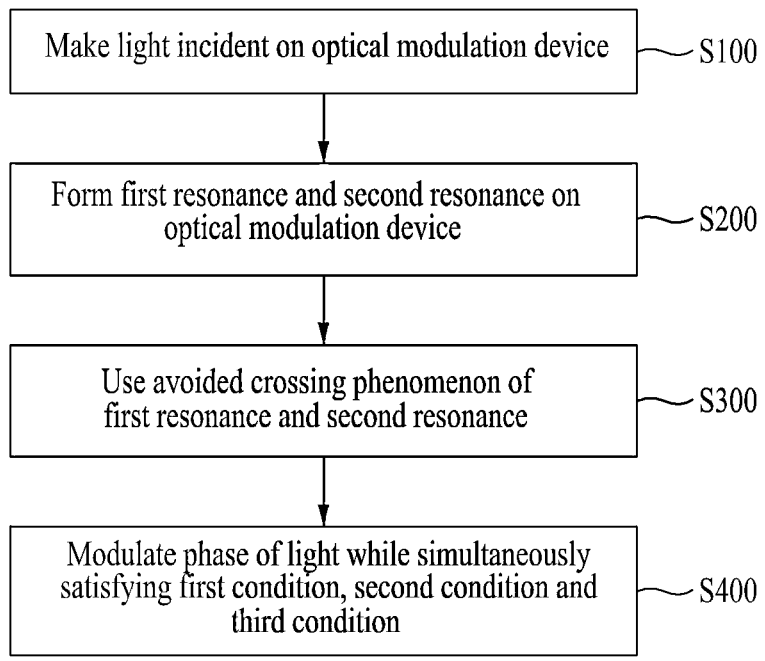
FIG. 9 is a flowchart for describing a phase modulation method using the optical modulation device according to embodiments of the present disclosure.

FIG. 9 is a flowchart for describing a phase modulation method using the optical modulation device according to embodiments of the present disclosure.

Referring to FIG. 9, the phase modulation method using the optical modulation device according to the present disclosure may include making light incident on the optical modulation device (S100), forming a first resonance and a second resonance on the optical modulation device (S200), using the avoided crossing phenomenon of the first resonance and the second resonance (S300), and modulating a phase of light while simultaneously satisfying the first condition, the second condition and the third condition (S400).

In this case, the first resonance is a fast-moving resonance compared to the second resonance, and may be graphene Plasmon, for example. The second resonance is a resonance having a narrow spectrum compared to the first resonance, and may be qBIC, for example. The first condition is to actively greatly change a resonant frequency. The second condition is to reduce the FWHM of a resonant spectrum (i.e., to minimize an energy loss of a resonance). The third condition is to constantly maintain amplitude. According to the phase modulation method using the optical modulation device according to the present disclosure, a change in the phase may be $2\pi$ or more. More specifically, a change in the phase may be $2\pi$ to $4\pi$.

Although the embodiments of the present disclosure have been described with reference to the accompanying drawings, a person of ordinary knowledge in the art to which the present disclosure pertains may understand that the present disclosure may be implemented in other detailed forms without changing the technical spirit or essential characteristics of the present disclosure. Accordingly, it is to be understood that the aforementioned embodiments are only illustrative, but are not limitative in all aspects.

The embodiments of the invention in which an exclusive property or privilege is claimed are defined as follows:

1. An optical modulation device comprising:
   a reflection plate;
   an insulating film over the reflection plate;
   dielectric patterns aligned on the insulating film in a first direction and extended in parallel in a second direction intersecting the first direction; and
   first graphene patterns provided between the dielectric patterns and second graphene patterns provided between the dielectric patterns aligned in the first direction and arranged in an alternating fashion such that a first side of a first dielectric pattern of the dielectric patterns is separated from an adjacent second dielectric pattern of the dielectric patterns by a graphene pattern of the first graphene patterns and a second side of the first dielectric pattern is separated from an adjacent third dielectric pattern of the dielectric patterns by a graphene pattern of the second graphene patterns,
   wherein the first and second graphene patterns are in direct contact with the insulating film and the dielectric patterns are in direct contact with the insulating film at locations between the first and second graphene patterns, and a width of each of the first graphene patterns in the first direction is different from a width of each of the second graphene patterns in the first direction; and wherein each of the first graphene patterns comes into direct contact with a sidewall of each of the dielectric patterns on each side thereof and each of the second graphene patterns comes into direct contact with a sidewall of each of the dielectric patterns on each side thereof.

2. The optical modulation device of claim 1, wherein each of the first and second graphene patterns has a single layer structure or a multi-layer structure in which two to ten layers are stacked.

3. The optical modulation device of claim 1, wherein the dielectric patterns comprise dielectric pattern pairs that are periodically aligned in the first direction.

4. The optical modulation device of claim 1, wherein the width of each of the first graphene patterns in the first direction and the width of each of the second graphene patterns in the first direction are predetermined so that graphene Plasmon Fabry-Perot resonates between the dielectric patterns.

5. The optical modulation device of claim 1, wherein the dielectric patterns comprise:
 a first plurality of dielectric patterns, and
 a second plurality of dielectric patterns facing the first plurality of dielectric patterns in the second direction and isolated from the second plurality of dielectric patterns in the second direction.

6. The optical modulation device of claim 1, wherein the reflection plate comprises a metal substance or conductive metal nitride.

7. The optical modulation device of claim 1, wherein a thickness of each of the dielectric patterns and a width of each of the dielectric patterns in the first direction are identical.

8. A phase modulation method using the optical modulation device of claim 1, the method comprising:
 making incident light on the optical modulation device;
 forming a different first resonance and second resonance on the optical modulation device;
 using an avoided crossing phenomenon of the first resonance and the second resonance; and
 modulating a phase of the light while simultaneously satisfying a first condition in which a resonant frequency is actively greatly changed, a second condition in which a full width at half maximum (FWHM) of a resonant spectrum is reduced, and a third condition in which amplitude is constantly maintained.

9. The phase modulation method of claim 8, wherein:
 the first resonance fast moves compared to the second resonance, and
 the first resonance is graphene plasmon.

10. The phase modulation method of claim 8, wherein:
 the second resonance has a narrow spectrum compared to the first resonance, and
 the second resonance is quasi-bound states in the continuum (qBIC).

11. The phase modulation method of claim 8, wherein a distribution of electric fields of the first resonance and a distribution of electric fields of the second resonance are at least partially overlapped.

12. The phase modulation method of claim 8, wherein a change in the phase of light is $2\pi$ to $4\pi$.

13. The phase modulation method of claim 8, wherein as graphene mobility of the first and second graphene patterns are increased, an absolute value of complex amplitude of the light is increased.

14. The phase modulation method of claim 13, wherein a width of each of the first graphene patterns in the first direction and a width of each of the second graphene patterns in the first direction are predetermined so that graphene Plasmon Fabry-Perot resonates between the dielectric patterns.

15. The phase modulation method of claim 8, wherein a width of each of the first graphene patterns in the first direction is different from a width of each of the second graphene patterns in the first direction.

16. The phase modulation method of claim 8, wherein the dielectric patterns and the first and second graphene patterns fully cover a top of the insulating film.

17. The phase modulation method of claim 8, wherein:
 each of the first and second graphene patterns comes into direct contact with sidewalls of the dielectric patterns on both sides thereof, and
 the dielectric patterns come into direct contact with a top of the insulating film.

18. An optical modulation device comprising:
 a reflection plate;
 an insulating film over the reflection plate;
 dielectric patterns aligned on the insulating film in a first direction and extended in parallel in a second direction intersecting the first direction; and
 first graphene patterns provided between the dielectric patterns and second graphene patterns provided between the dielectric patterns aligned in the first direction and arranged in an alternating fashion such that a first side of a first dielectric pattern of the dielectric patterns is separated from an adjacent second dielectric pattern of the dielectric patterns by a graphene pattern of the first graphene patterns and a second side of the first dielectric pattern is separated from an adjacent third dielectric pattern of the dielectric patterns by a graphene pattern of the second graphene patterns;
 wherein the first and second graphene patterns are in direct contact with the insulating film and the dielectric patterns are in direct contact with the insulating film at locations between the first and second graphene patterns;
 a width of each of the first graphene patterns in the first direction is different from a width of each of the second graphene patterns in the first direction; and
 wherein the dielectric patterns and the first and second graphene patterns fully cover a top of the insulating film.

19. An optical modulation device comprising:
 a reflection plate;
 an insulating film over the reflection plate;
 dielectric patterns aligned on the insulating film in a first direction and extended in parallel in a second direction intersecting the first direction; and
 first graphene patterns provided between the dielectric patterns and second graphene patterns provided between the dielectric patterns aligned in the first direction and arranged in an alternating fashion such that a first side of a first dielectric pattern of the dielectric patterns is separated from an adjacent second dielectric pattern of the dielectric patterns by a graphene pattern of the first graphene patterns and a second side of the first dielectric pattern is separated from an adjacent third dielectric pattern of the dielectric patterns by a graphene pattern of the second graphene patterns;

wherein the first and second graphene patterns are in direct contact with the insulating film and the dielectric patterns are in direct contact with the insulating film at locations between the first and second graphene patterns;

a width of each of the first graphene patterns in the first direction is different from a width of each of the second graphene patterns in the first direction; and wherein the dielectric patterns comprise silicon (Si).

\* \* \* \* \*